United States Patent [19]
Chambers

[11] Patent Number: 5,293,352
[45] Date of Patent: Mar. 8, 1994

[54] METHOD FOR REMOVING NOISE DUE TO NEAR SURFACE SCATTERERS

[75] Inventor: Ronald E. Chambers, Houston, Tex.

[73] Assignee: Western Atlas International, Inc., Houston, Tex.

[21] Appl. No.: 1,444

[22] Filed: Jan. 7, 1993

[51] Int. Cl.$^5$ .................................................. G01V 1/36
[52] U.S. Cl. ........................................ 367/38; 367/50; 367/21
[58] Field of Search ................ 367/21, 38, 50, 74, 367/54

[56] References Cited

U.S. PATENT DOCUMENTS

| | | | |
|---|---|---|---|
| 4,866,679 | 9/1989 | Chambers | 367/47 |
| 4,907,205 | 3/1990 | Yanchak | 367/52 |
| 4,910,716 | 3/1990 | Kirlin et al. | 367/24 |
| 4,935,904 | 6/1990 | Chambers | 367/38 |
| 4,937,794 | 6/1990 | Marschall et al. | 367/21 |
| 4,992,995 | 2/1991 | Favret | 367/43 |

OTHER PUBLICATIONS

Larner, Ken; Chambers, Ron; Yang, Mai; Lynn, Walt; Wai, Lillon "Coherent Noise in Marine Seismic Data", 51st Annual Int.'1 SEGMeeting, Nov. 14, 1981, Los Angeles, Calif.

Encyclopedic Dictionary of Exploration Geophysics (Robert E. Sheriff, erd ed.), Definition of Exploding Reflector, p. 109.

*Primary Examiner*—Ian J. Lobo
*Attorney, Agent, or Firm*—William A. Knox

[57] ABSTRACT

A set of raw common shot gathers are resorted as common receiver gathers. The wavefield envelopes from the common receiver gathers are migrated using one half the near-surface velocity to provide migrated data sets. The migrated data sets are resorted back into common shot gathers and subtracted from the original raw common shot gathers to provide coherent-noise-reduced data sets.

4 Claims, 2 Drawing Sheets

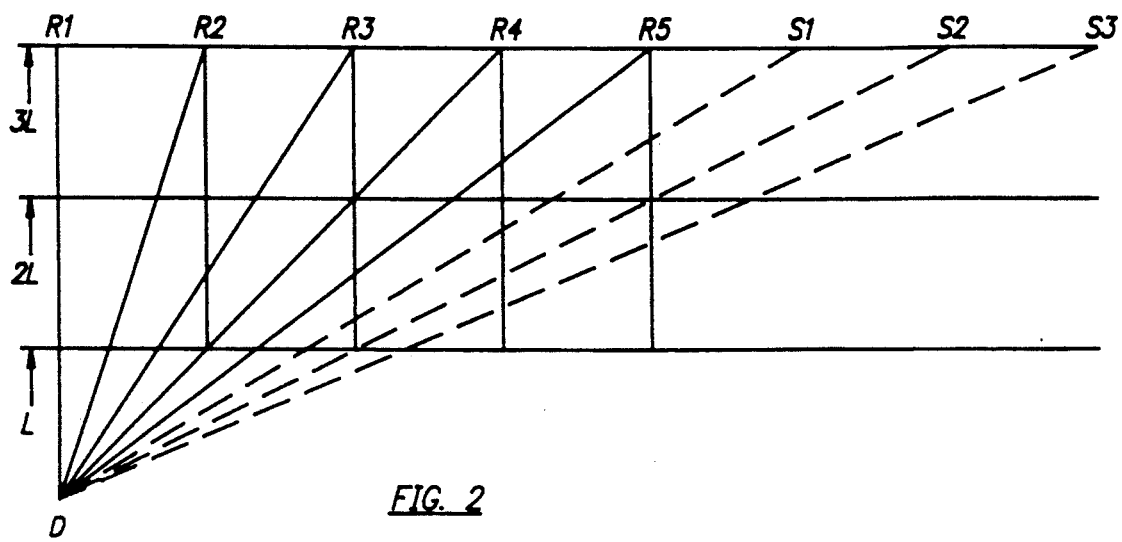
FIG. 2
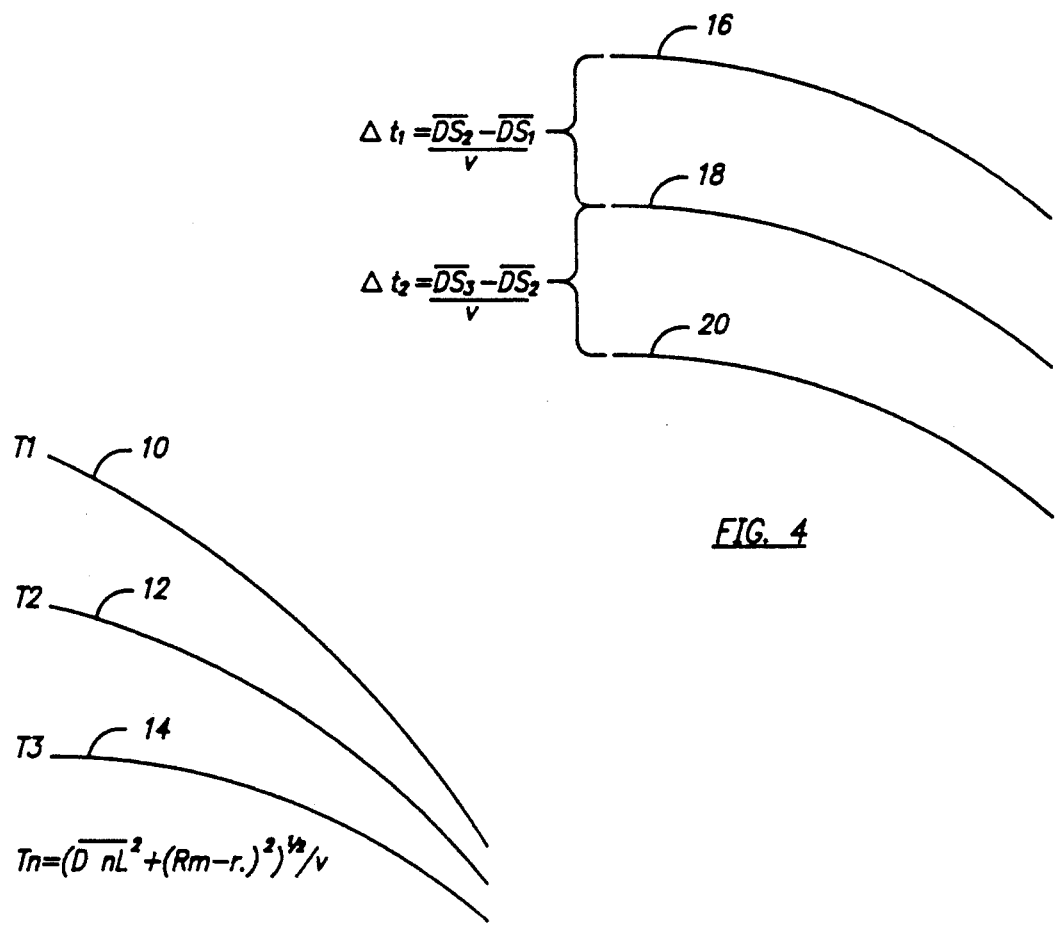
$\Delta t_1 = \dfrac{\overline{DS_2} - \overline{DS_1}}{v}$
$\Delta t_2 = \dfrac{\overline{DS_3} - \overline{DS_2}}{v}$
FIG. 4
$T_n = (\overline{D\ nL}^2 + (R_m - r.)^2)^{1/2}/v$
FIG. 3

METHOD FOR REMOVING NOISE DUE TO NEAR SURFACE SCATTERERS

BACKGROUND OF THE INVENTION

1. Field of the Invention

This invention relates to seismic data processing and in particular to a method for attenuating the diffraction artifacts that are due to point-source scatterers that lie relatively close to the surface of the earth.

2. Discussion of the Related Art

In the art of geophysical seismic exploration, a plurality of seismic signal receivers are distributed over the earth along a line of survey at desired intervals commonly referred to as group intervals. An acoustic source occupies a series of positions, termed shot points, along the line, spaced-apart by some preferred multiple of the group interval. The source insonifies the earth at each shot point. A wavefield, emitted by the source, travels outwardly through the subsurface of the earth whence it is reflected or refracted back to the surface from various discontinuities which may be actual stratigraphic bedding planes or may simply be rough spots in the ground. The returning acoustic waves are detected by the receivers which convert the physical acoustic waves to electrical time-dependent seismic signals.

Seismic data processing, as is well known, provides means for converting the fleeting time-dependent seismic signals into time-scale cross section images for visually displaying some desired attribute of the subsurface of the earth such as its stratification. The accidental concomitant superposition on the cross section of seismic signals that represent an undesired attribute, is considered to be noise contamination. Acoustic studies are, of course, not confined to geophysical operations; they may also be applied to other arts, such as human tomography and non-destructive testing of structures, to which the teachings of this invention may be applicable.

Noise may be incoherent or random such as that due to wind, vehicular, pedestrian or bestial traffic on land. At sea, ship vibrations, surging of the hydrophone cable, flow noise of water around the cable and hydrophones, tugging of the cable by the tail buoy and marine life contribute to acoustic interference. Much of that sort of noise can be removed by destructive cancellation during routine stacking processes.

Noise also may be coherent. Assuming that primary reflection data from earth strata are the desiderata, coherent noise may comprise refractions, multiple reflections, reflected refractions or refracted reflections, diffractions from point sources on a rugose sea floor or from fault scarps, and coherent noise from mechanical sources such as the regular beating of a ship's screw. A particularly irksome noise source is the repetitive firing of a seismic acoustic source by a competing geophysical crew that may be many miles away. FIG. 1 is an example of severe coherent noise.

Some types of coherent noise can be removed by frequency filtering but only provided that the amplitude spectrum of the noise does not overlap the spectrum of the desired signal. Other well-known methods include spatial filtering, common offset or common midpoint stacking, vertical or lateral data averaging, array forming and beam steering. Velocity filtering is useful provided the velocity (i.e. the step-out time between adjacent traces, dx/dt) of the desired signal is different than the apparent velocity of the contaminating noise. However, it has been shown that energy diffracted from shallow point-sources may be actually enhanced when processed according to classical methods such as CMP stacking. See for example, *Coherent Noise in Marine Seismic Data*, by K. Larner et al., Geophysics, v. 48, n. 7, July, 1983.

U.S. Pat. No. 4,935,904 issued Jun. 19, 1990 to Chambers et al. discloses a method for suppressing coherent noise artifacts due to the abrupt termination of data processing at the lower boundary of a seismic recording. The boundary-effect artifacts are removed from the seismic recording by first extending the recording in time by padding it with zero data. The net effect is to push the boundary-effect artifacts below the time zone of interest. The extended recording is then clipped back to its original length in time, sans the pesky boundary-effect diffractions which now reside in the clipped-off portion of the recording.

Removal of coherent other-ship noise from a competing geophysical crew is taught by U.S. Pat. No. 4,937,794 issued Jun. 26, 1990 to Marschall et al. In this patent, the noise is removed by first rearranging the common shot gathers from normal shooting into common receiver gathers. Pairs of traces from a common receiver gather are corrected for differential moveout, weighted in inverse relation to the RMS signal power and combined to create compressed common receiver gathers. The compressed common receiver gathers may be reformatted to common midpoint gathers for further processing.

Another noise reduction method is taught by U.S. Pat. No. 4,866,679, issued Sep. 12, 1989 to R. Chambers for a Method for Identifying Anomalous Noise Amplitudes in Seismic Data. The method is accomplished by deriving a measured amplitude factor over predetermined time windows for a predetermined number of traces. A noise free amplitude factor for the same periods of time and number of traces is also computed using a Gauss-Seidel method of matrix inversion. A ratio of measured and noise free amplitude factors is made to determine a correction factor which is compared to a user-defined threshold value for determining the presence of anomalous noise amplitudes in the seismic records. Based on the comparison of the correction factor to the threshold value, the user determines whether to suppress or correct the traces experiencing the anomalous noise amplitudes.

A low-tech filtering process that sometimes works when more sophisticated techniques are temporarily unavailable, is the use of simulated anamorphic projection. To use that method on FIG. 1, for example, squint sideways across the Figure at an oblique angle. The reflected energy stands out at the expense of the noise. Reflections can be seen clearly from about 1.7 to nearly 4.0 seconds.

The above methods for suppressing coherent noise are special-purpose methods. There is a need for a more generally-applicable method for suppressing coherent noise that results from scatters that lie near the region where the seismic source and receivers are emplaced.

SUMMARY OF THE INVENTION

This invention requires the provision of raw, common shot gathers that are unprocessed except for coordinate information. The wavefields present thereon are either migrated using the near-surface velocity to provide collapsed images of the near-surface diffractors or alternatively, the data may be time shifted using the true near-surface velocity to enhance the near-surface diffractors. The data are resorted as common receiver gathers and are array-formed after applying corrections for differential source position. The common receiver gathers are resorted back to common shot gathers. The common shot gathers are then reconstituted by either inverse migration or by reverse time shifting, depending upon which of the two alternative processing routines are selected. The reconstituted common shot gathered data are subtracted from the corresponding original raw common shot gathers thereby to reduce the noise in the data sets. The noise-reduced data sets may be conventionally processed and interpreted in the usual manner.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention:

FIG. 2 illustrates the concept of an exploding reflector as applied to a shallow point source diffractor;

FIG. 3 displays a family of hyperbolae that would be seen on a common source gather;

FIG. 4 is a showing of a family of hyperbolae as seen on a common receiver gather;

DETAILED DESCRIPTION OF THE PREFERRED EMBODIMENT

Figure 1:
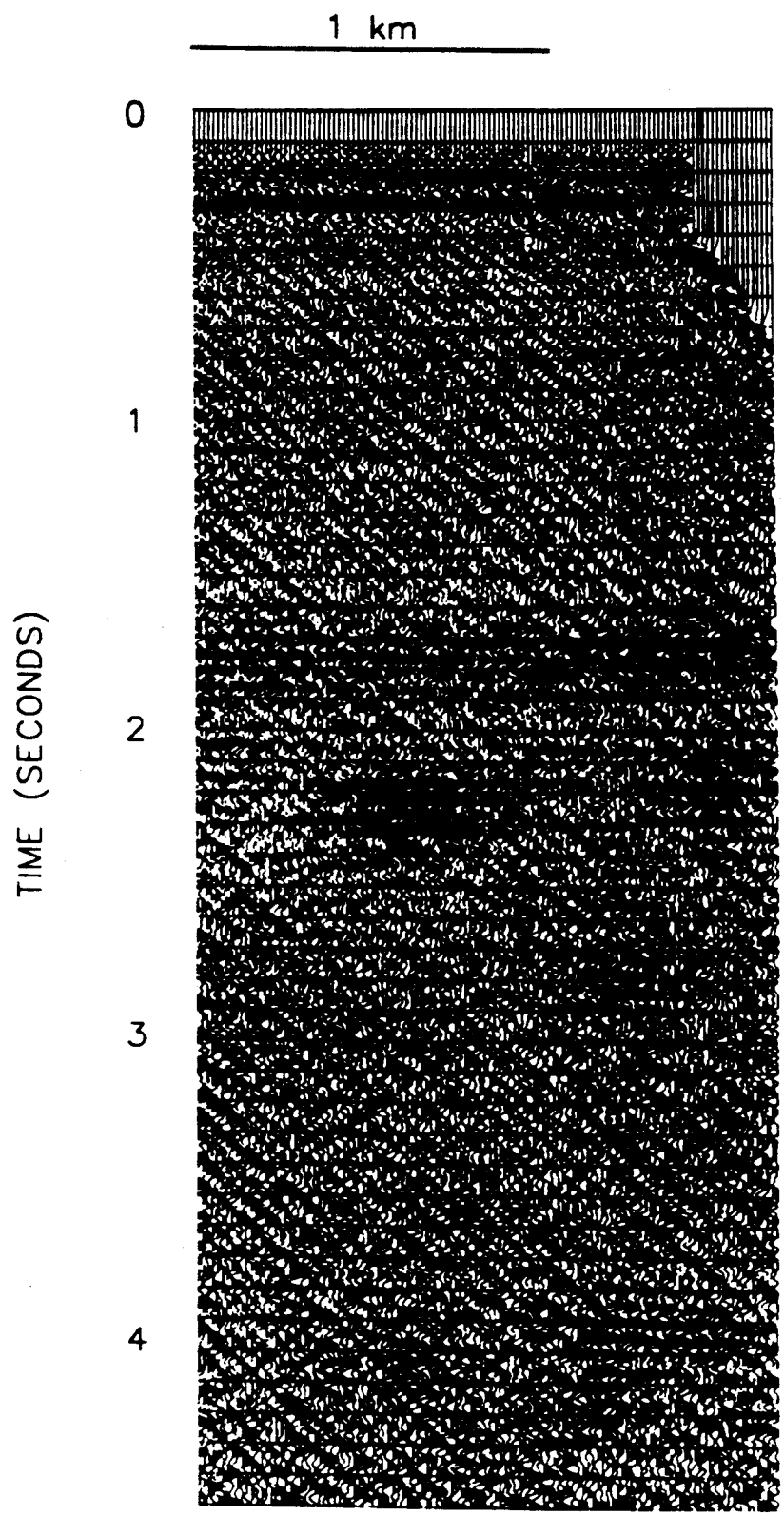
FIG. 1 is a prior-art illustration of coherent noise.

As explained in the introduction to this disclosure, coherent noise due to randomly-distributed shallow diffractors is particularly troublesome. While the apex of a diffraction pattern is imaged early on a time-scale display, because of the low near-surface velocity, the hyperbolic cusps of the diffraction pattern stretch so deeply in time as to severely obscure deep-seated reflected events. The term "shallow" means a depth range on the order of magnitude of one to a few group intervals. The source of scattering does not necessarily lie vertically below the seismic array. The scattered energy may originate from anywhere within a three-dimensional half-space around the line of survey.

For purposes of the ensuing analysis, the concept of an exploding reflector is now introduced. Dr. Sherriff at page 109 of the Encyclopedic Dictionary of Exploration Geophysics, 1991 edition, defines an exploding reflector as a direct modeling scheme in which the model surfaces are assumed to explode at time zero with explosive strengths proportional to their reflectivity. Velocities, V, are cut in half so that the one-way time to the surface equals the two-way traveltime for coincident source-receiver pairs at the surface.

FIG. 2 is a drawing showing a diffracting medium D that, having been illuminated by acoustic energy from a source such as S1, radiates energy to seismic receivers R1-R5, thereby becoming a new source. For purposes of this exegesis, the respective receivers R1-R5 may be located in line with each other at any one of the three levels L, 2L, 3L located one, two or three group intervals distant from the line of receivers Rm to simulate the appearance of three different distance-dependent diffraction patterns. The acoustic propagation velocity is assumed to be two group-interval distance units per unit of time.

FIG. 3 shows the traveltime hyperbolae 10, 12, 14 for three different distance levels for a common shot gather from S1. The travel time from any one source such as S1 to the same diffractor D is constant. The relative traveltime curves Tn corresponding to each level nL therefore are determined from $$Tn = ((D\ nL)^2 + (Rm - R1)^2)^{\frac{1}{2}}/v,$$

where $v = V/2$, m and n are integers, and (D nL) symbolizes the perpendicular distance from D to the level i n question.

It is to be observed that the slopes of all three curves ultimately converge to become asymptotic to the slowness $1/V$.

FIG. 4 is a showing of the traveltime diffraction patterns for a common receiver gather, assuming the receivers Rm are located at level 2L. All of the patterns 16, 18, 20 seen by the same receiver from the same diffractor but from different shot points must be identical as shown. The difference in time between the traveltime hyperbolae 16, 18, 207 is the difference in travel time between the respective sources S1, S2, S3, ..., Sn and the diffractor D, The difference is a constant over the entire envelopes of both hyperbolae for any two source positions. That is, the time differentials, due to differential source distances, between the apices of the respective hyperbolae are $$\Delta t_1 = (D\ S2 - D\ S1)/V,$$

$$\Delta t_2 = (D\ S3 - D\ S2)/V, \text{ and}$$

$$\Delta t_n = (D\ Sn+1 - D\ Sn)/V.$$

In simplest terms, the acoustic profile data are provided in the form of raw common source gathers. The waveform envelopes due to undesired nearby scatters are enhanced at the expense of the desired, more deeply-seated reflection data to form common receiver gathers wherein only the coherent noise now resides. The enhanced waveform envelopes are reconstituted back to common source gathers and are subtracted from the original raw common source gathers thereby canceling the unwanted data from the original data set.

Either of two preferred modes may be used for practicing this invention, the first of which will now be explained. The seismic data are formatted in common shot gathers as is customary. However, the raw data are not preprocessed for static corrections, deconvolution, inverse-spreading gain correction and the like although spatial coordinate information is included. The diffraction patterns seen on the selected common shot gathers are migrated using the near-surface velocity, employing the exploding reflector technology previously discussed in connection with FIG. 3. Preferably Stolt f - k post stack migration is performed to collapse the diffraction hyperbolae. For each individual output trace within a given shot gather, the migration process proceeds as follows: First time-shift the entire gather to compensate for the source-to-receiver traveltime. Then apply the Stolt migration process. Because the near-surface velocity is used, only the diffraction hyperbolae will be imaged and isolated; all other wavefields will be incorrectly imaged.

The undesired waveform envelopes are enhanced at the expense of the deep, desired reflection data by now resorting the data into common receiver gathers which are next combined by array-forming after making suitable corrections for source-diffractor differential traveltimes as earlier outlined. The thus array-formed common receiver gathers are resorted back into common shot gathers which are reconstituted by inverse migration and reverse time shifting. The reconstituted common shot gathers are subtracted from the corresponding original raw common shot gathers, thereby to attenuate the coherent diffraction noise from the recorded data. The now noise-reduced data sets are then conventionally processed and interpreted in the usual manner. The term "interpreted" means the act of constucting a spatial geologic model from the displayed and processed geophysical data sets.

The migration process as above outlined is preferably provided array geometry is such that the data are not apatially aliased. In the presence of spatial aliasing, the migration procedure will not properly image the data as is well known in the industry. Accordingly the simple time-shift method must be used as will now be explained.

In an alternative method, with reference to FIG. 4, the data sets are first formatted into common shot gathers but are otherwise unprocessed as above explained. The common shot gathers are resorted and combined into common receiver gathers. A constant time shift is applied to each member of the gather to compensate for the travel time differential, $\Delta t_n$, between the respective shots as shown in FIG. 4. The common receiver gathers are combined by array forming. The imagery of the waveform envelopes due to shallow diffractors will be enhanced by reason of the combining step because, for the same receiver, the patterns all have the same shape, albeit displaced in time as previously explained. On the other hand, all the deeper events will become severely attenuated due to the uncorrected angularity misalignment between the respective source locations. The common receiver gathers are resorted back to common shot gathers. The resorted common shot gathers must now be reconstituted by reverse time shifting. The reconstituted common shot gathers are subtracted from the corresponding original raw common shot gathers to attenuate the coherent noise artifacts. The reduced-noise data sets may then be conventionally processed and interpreted as usual.

The method as disclosed will remove the annoying diffraction pattern virtually completely. In prior-art methods, migration alone, without more, will indeed collapse a diffraction event to its origin but it still remains as a somewhat flattened but spurious waveform confusingly similar to a desired primary reflection. Only by isolating the unwanted coherent interference from all other waveforms and subtracting out the reconstituted diffraction artifacts from the original data set, can the interference be successfully attenuated.

This invention has been described with a degree of specificity for purposes of example and illustration but no by way of limitation. Other approaches will be devised by those skilled in the art but which will fall within the scope and spirit of this invention which is limited only by the appended claims.

What is claimed is:

1. In an acoustic data set, a method for reducing coherent noise contamination from shallow scatterers, comprising:

measuring the near surface velocity;
   providing a suite of raw common source gathers displaying acoustic waveform envelopes;
   enhancing the imagery of the waveform envelopes due to shallow acoustic scatterers at the expense of deep-seated acoustic reflection data by
   (1) time-shifting said waveform envelopes in proportion to the source/receiver traveltime,
   (2) migrating the time-shifted waveform envelopes using the measured near-surface velocity;
   sorting the image-enhanced common source gathers to common receiver gathers;
   array-forming said common receiver gathers to generate combined common receiver gathers;
   resorting said combined common receiver gathers to combined common source gathers;
   reconstituting said combined common source gathers; and
   subtracting the reconstituted resorted combined common source gathers from said suite of raw common source gathers.

2. The method as defined by claim 1, wherein the step of reconstituting comprises;
   inverse migrating and reverse time shifting said waveform envelopes.

3. A method for reducing coherent noise contamination, due to near-surface scatterers, from an acoustic data set, comprising:

providing a suite of raw common source gathers displaying acoustic waveform envelopes;
   measuring the near-surface velocity;
   sorting said common source gathers to common receiver gathers;
   enhancing the imagery of the waveform envelopes due to near-surface scatterers at the expense of deep-seated acoustic reflection data by time shifting said common receiver gathers in proportion to the differential distance between sources using said measured near-surface velocity;
   array-forming the time-shifted common receiver gathers to form combined common receiver gathers;
   resorting said combined common receiver gathers to combined common source gathers;
   reconstituting the resorted combined common source gathers; and
   subtracting the reconstituted resorted combined common source gathers from said suite of raw common source gathers.

4. The method as defined by claim 3, wherein the step of reconstituting comprises:
   reverse time-shifting said common source gathers.

* * * * *